Figure 1:
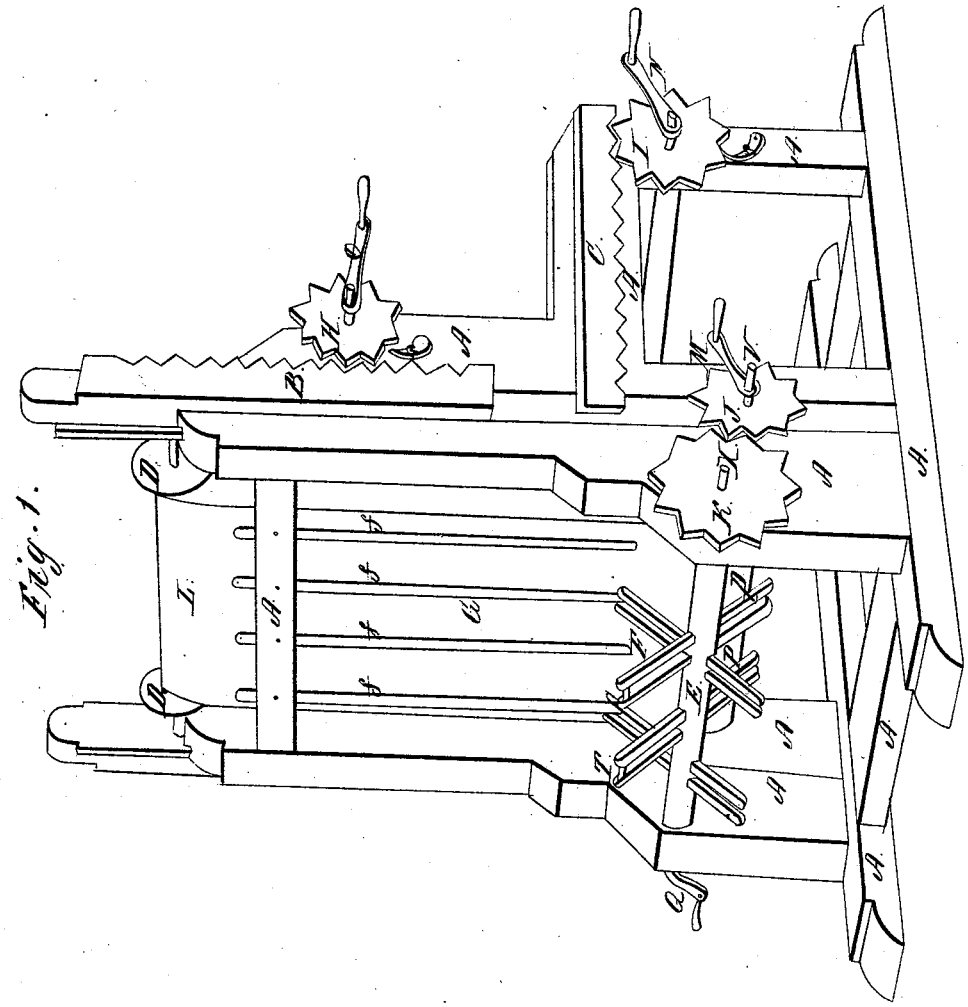

J. Wentworth,
Carpet Cleaner,
№ 6,855. Patented Nov. 6, 1849.

UNITED STATES PATENT OFFICE.

JOSEPH WENTWORTH, OF PALATINE, NEW YORK.

IMPROVEMENT IN CARPET-CLEANING MACHINES.

Specification forming part of Letters Patent No. 6,855, dated November 6, 1849.

*To all whom it may concern:*

Be it known that I, JOSEPH WENTWORTH, of Palatine, county of Montgomery, and State of New York, have invented a new and useful machine for dusting, cleaning, and otherwise improving carpets and other fabrics of wool, cotton, hemp, flax, and silk, and for other purposes; and I do hereby declare that the following is a full, clear, and exact description of the character and operation of the same, reference being had to the annexed drawing, making a part of this specification, in which the figure represents a view of the machine as seen by a person placed at the right hand of the front thereof, so as to have his line of vision form an angle of about forty-five degrees with the armed shaft.

In the figure the letter A represents the frame-work of the machine.

B represents the perpendicular slide designed to support one axle of the second roller D D.

C represents the horizontal slide designed to support one axle of the third roller.

D D represent the second roller, around which the carpet is wrapped.

E represents the armed shaft, which strains the elastic rods.

F represents the arms, into the ends of which the rollers are inserted by which the ends of the elastic rods are caught up, and from which they slip with violence as the shaft revolves.

G represents the elastic rods, by the recoil-strokes of which the carpet is beaten as it moves around upon the revolving rollers immediately behind.

H represents the cog-wheel interlocking with the cogs of the perpendicular slide B, and designed to raise and lower the same, and thereby tighten and loosen the carpet.

I represents the cog-wheel interlocking with the cogs of the horizontal slide C, in which is inserted the axle of the third roller, and is designed to move the same backward and forward, and thereby tighten and loosen the carpet.

J represents the cog-wheel on the axle of the first roller P, and by interlocking with the cog-wheel K on the axle of the armed shaft causes the said shaft to revolve.

K represents the cog-wheel on the axle of the armed shaft.

L represents the carpet passing around the second roller D D.

M represents the crank upon the axle of the first or lower rollers by which that and the armed shaft are caused to revolve.

N represents the crank upon the axle of the shaft, upon which the cog-wheel is placed that moves the horizontal slide.

O represents the crank upon the axle of the shaft, upon which are placed cog-wheels, by which the perpendicular slides are moved.

P represents the lower part of the first roller, upon the axle of which the cog-wheel J is placed.

Q represents the crank upon the axle of the armed shaft opposite to that upon which the cog-wheel K is put, and is designed to co-operate with the crank M in turning the machinery.

If the observer be placed in front of the machine, but so far to the left thereof as to have his line of vision form an angle of forty-five degrees with the armed shaft, he will have a view of the machine corresponding with the draft annexed in all respects, except that there will be no cranks upon the then visible axles of the shafts upon which cog-wheels H and I are placed, nor on the left-hand axle of the first roller, but instead thereof there will be placed a crank on the left-hand axle of the armed shaft. It is believed these two views will bring every part of the machine under observation except the third roller, having its axle inserted in sockets in the horizontal slide C and its corresponding slide on the other side near the back end thereof, and the shaft upon which the cog-wheels are placed, which move the perpendicular slides. This roller may be from six to eighteen inches in diameter, and of course in length, exclusive of the axles or gudgeons, corresponding with the distance of the two horizontal slides from each other. The shafts (not represented by the aforesaid two views) will be from four to six inches in diameter and correspond in length with the distance of the cog-wheels which interlock with the cogs of the perpendicular slides from each other, and having axles or gudgeons which will pass through those cog-wheels and receive on one or both of them the crank by which it is turned. This shaft may be represented by figure 5 on the draft.

Place upon the ground parallel with each other and at the distance of about twenty feet from each other two blocks of timber twelve inches square and from twelve to twenty feet long and frame in cross-pieces or sills near each end for a platform A. Insert in or near the center of each of these blocks by means of a large mortise and tenon, and perhaps braces, an upright post A of some twelve feet in height, one and one-half feet in width, parallel with the blocks of timber, and twelve inches thick. Place a beam A across from the one to the other of these upright posts of four inches of horizontal and eight inches of perpendicular thickness, by mortise and tenons or by holding and pinning the ends thereof firmly into the front of said posts about seven feet above the platform. In this beam at the distance of four inches from each other insert elastic rods G, of wood, steel, or other material, of a proper size and shape, projecting downward from the beam about three and one-half feet in nearly a perpendicular direction. In front of these rods, a little below the ends thereof and from four to eight inches therefrom, place a twenty-foot shaft E, with axles at each end X, supported by blocks A of timber placed upon the platform-block in front of and firmly attached to the upright posts A. Through this shaft E, which may be made of wood or iron, or both, opposite each of the rods G, insert a piece of tough timber F, three inches wide lengthwise of the shafts E, and one and one-half inch thick the other way, with a sufficient projection of each end to reach as the shaft E revolves around, to the ends of the rods G. From the ends of these projecting arms F saw from the center two inches, leaving two prongs of one-half inch thickness. Between these prongs, near the point thereof, insert a roller T of about an inch diameter, upon which the ends of the rods G will catch and from which they will recoil with violence as the shaft E turns around. This shaft E might be turned by the strength of a man placed at each end by means of a crank attached to the end of each axle Q and M. If not, horse or other power might be easily and safely applied.

In order to present successive portions of the surface of the spread carpet or other fabric to the strokes of the rods G as the shaft E revolves, a roller P of about one or two feet diameter should extend from one of the upright posts A to the other supported by axles V passing through said posts, so as to bring the front of said roller P a foot or two below and about an inch back of the perpendicular line of the rods G. This roller P should be turned by means of a cog-wheel J on the axle thereof, interlocking with a cog-wheel K, attached to the axle of the shaft E. Above this roller P should be inserted into the aforesaid upright posts a foot above the beam A the axles of a smaller roller D D of the same length of the first, having an easy play, so that a line drawn from the front thereof to the front of the roller P below would pass about an inch behind the rods G. Around these two rollers the carpet, or other fabric to be cleaned should be spread and sewed together, and in order to draw the carpet or other fabric tight around these rollers, so as to be moved by the revolution of the lower roller P, another small roller might be used having its axles inserted near the ends of two bars inserted horizontally through the upright posts some five feet above the platform so as to be drawn backward and forward according to the length of the carpets, and be fastened in the proper position with a screw through the posts. This would be the simplest contrivance and would probably effect the object sought with convenience and safety; but to avoid any hazard that might arise from the surface of the carpet moving toward the points of the rods, while in motion an additional wheel might be used in the gearing, which would reverse the motion of the carpet or other fabric and remove all danger of injuries from the ends of the rods while in play. Instead of the upright posts of one and one-half feet width, as hereinbefore mentioned, two small posts of the same height might be inserted near the middle of each platform-block about three inches apart and grooved for the purpose of confining slides for supporting and raising and lowering the second roller by means of cogs meshing in with a cog-wheel to be turned by a crank. A similar contrivance might also be attached to the horizontal bars which are designed to support and move the third roller. In that case the bars should be stationary and supported by some kind of frame-work.

The figure represents a machine of the latter description—that is to say, with slides B and C, in which the axles of the second and third rollers are inserted, and by which, through the operation of cog-wheels H and I, they are drawn nearer to and thrust farther from the first roller P, and the carpet thereby tightened or loosened, so as to feel more or less its motion.

What I claim as my invention, and desire to secure by Letters Patent, is—

The application of the recoil-strokes of elastic rods from tension, as described, to successive portions of a carpet or other fabric moved over rollers in sliding frames made adjustable by means described, by means of which the carpet or other fabric is rapidly and smartly beaten, and thereby cleansed from its dust and other impurities and otherwise improved.

JOSEPH WENTWORTH.

Witnesses:
 JNO. CUMMING,
 J. S. SMITH.